(12) United States Patent
Guillou et al.

(10) Patent No.: US 9,401,611 B2
(45) Date of Patent: Jul. 26, 2016

(54) RECHARGING OF A POOL OF BATTERIES

(75) Inventors: Hervé Guillou, Paris (FR); Duy Long Ha, Chambery le Vieux (FR)

(73) Assignee: Commissariat a L'energie Atomique et aux Energies Alternatives, Paris (FR)

( * ) Notice: Subject to any disclaimer, the term of this patent is extended or adjusted under 35 U.S.C. 154(b) by 126 days.

(21) Appl. No.: 14/234,927

(22) PCT Filed: Jul. 26, 2012

(86) PCT No.: PCT/EP2012/064700
§ 371 (c)(1),
(2), (4) Date: Mar. 6, 2014

(87) PCT Pub. No.: WO2013/014238
PCT Pub. Date: Jan. 31, 2013

(65) Prior Publication Data
US 2014/0167678 A1 Jun. 19, 2014

(30) Foreign Application Priority Data

Jul. 26, 2011 (FR) ...................... 11 56796

(51) Int. Cl.
*H02J 7/00* (2006.01)
*H02J 3/00* (2006.01)
(Continued)

(52) U.S. Cl.
CPC ............. *H02J 7/0052* (2013.01); *H02J 7/0027* (2013.01); *H02J 7/041* (2013.01); *H02J 2003/003* (2013.01); *Y02T 10/7055* (2013.01); *Y04S 10/54* (2013.01)

(58) Field of Classification Search
CPC ................ H02J 7/00; H02J 7/04; H02J 7/16; H02J 7/24; H02J 7/0052; H02J 7/0027; H02J 7/041; H02J 10/44; H02J 10/46; H02J 1/10; H02J 3/00; H02J 2003/003; Y02T 10/7055; Y04S 10/54
USPC ............... 320/101, 138, 133, 155; 307/43, 86
See application file for complete search history.

(56) References Cited

U.S. PATENT DOCUMENTS 5,548,200 A 8/1996 Nor et al.
2010/0017249 A1 1/2010 Fincham et al.
(Continued)

FOREIGN PATENT DOCUMENTS

FR 2 952 247 A 5/2011
JP 2010-213507 A 9/2010

*Primary Examiner* — Phallaka Kik
(74) *Attorney, Agent, or Firm* — Frommer Lawrence & Haug LLP

(57) ABSTRACT

Method for recharging a pool of batteries from a recharging device (10) comprising several recharging terminals (14) supplied electrically from at least one energy production source (11), characterized in that it comprises the following steps:

Estimation of the future production of energy, i.e. the predicted energy $E_{predicted}$ and the predicted power $P_{predicted}(t)$ as a function of time t, in the course of a reference period by at least one energy production source;

Estimation of the energy need $\Sigma_i E_i(t)$ for the recharging of the batteries present in the recharging device;

Computation of a dummy power $P_{dummy}$ which is less than or equal to the predicted power and able to address all or part of this energy need in a dummy period which may or may not be distinct from the reference period;

Scheduling of the rechargings of the batteries present in the recharging device over this dummy period.

14 Claims, 6 Drawing Sheets

(51) Int. Cl.
*H02J 1/00* (2006.01)
*H02J 7/04* (2006.01)

(56) References Cited

U.S. PATENT DOCUMENTS

| | | |
|---|---|---|
| 2011/0127944 A1 | 6/2011 | Saito et al. |
| 2011/0133688 A1* | 6/2011 | Ishibashi ............. B60L 11/1809 320/101 |
| 2011/0202221 A1* | 8/2011 | Sobue ................... B60K 16/00 701/22 |
| 2012/0161692 A1* | 6/2012 | Kobayashi .......... B60L 11/1862 320/101 |
| 2012/0212173 A1 | 8/2012 | Ha et al. |
| 2012/0249088 A1* | 10/2012 | Abe .................... B60L 11/1844 320/164 |
| 2012/0293122 A1* | 11/2012 | Murawaka .......... B60L 11/1816 320/109 |
| 2012/0319642 A1* | 12/2012 | Suyama ................... H02J 3/32 320/101 |

* cited by examiner

RECHARGING OF A POOL OF BATTERIES

This application is a 371 of PCT/EP2012/064700 filed on Jul. 26, 2012, published on Jan. 31, 2013 under publication number WO 2013/014238, which claims priority benefits from French Patent Application Number 1156796 filed Jul. 26, 2011, the disclosure of which is incorporated herein by reference.

The invention relates to a method for managing the charging of a pool of batteries which is implemented at the level of a charging device supplied by at least one energy source and an actual battery charging device implementing such a method.

There exist numerous devices that operate with the aid of a battery, such as for example electric or hybrid vehicles. When the user of such an electrical device realizes that the charge of his battery is too low, he links it to a recharging device which utilizes an electrical energy source providing a current for recharging the battery.

When the electrical device concerned is an electric vehicle, the device for recharging the battery can take the form of a shelter defining a parking space and equipped electrically for electrical connection with the battery. Such a shelter can be equipped with photovoltaic panels generating electrical energy which is used for recharging the battery of the vehicle. In practice, the driver positions his vehicle under the shelter, connects it electrically to the energy source of the shelter to immediately initiate the recharging of the battery. The recharging phase is thereafter automatically halted by the recharging device as soon as the battery reaches its full charge.

Existing recharging devices in the form of shelters presented hereinabove are not optimized. Indeed, the recharging of the various batteries is initiated immediately upon their electrical connection, with the objective of their full charging. Now, this recharging may require energy originating from an expensive and/or polluting electricity production source when recharging the battery. Moreover, this energy source may be insufficient at a given instant, especially if several batteries are on charge simultaneously and/or if renewable energy sources are used, such as a solar or wind source, which is by nature fluctuating. Moreover, the total recharging of each battery might not be necessary for the envisaged future use.

To alleviate these drawbacks, document FR2952247 proposes a scheduling of the recharging of the vehicles on the basis of the knowledge of their departure date and of a desired level of charge.

Document U.S. Pat. No. 5,548,200 determines the choice of the electrical conditions and the moment of recharging so as to optimize the cost of recharging, during off-peak times for example.

Document US2010017249 states main principles for charging a pool of batteries consisting in taking account for example of the cost and quality of the available energy.

Document JP2010213507 describes an energy production method which combines the use of a battery with a photovoltaic production unit, without affording a solution in respect of the management of a pool of batteries.

The existing solutions remain insufficient to best utilize a recharging of a pool of batteries in a situation where the batteries arrive randomly at the level of a given recharging device, in combination with a use of an intermittent or simply discontinuous or rare energy source, to supply these rechargings, these sources possibly varying in a more or less unforeseeable way, such as sources of photovoltaic or wind energy.

Thus, there exists a need for an improved solution for intelligent management of the recharging of a pool of battery (batteries) from an intermittent energy source and more generally on the basis of an energy source that is not available continuously. For example, such a source could be a national electrical grid, whose use ought to be optimized and reduced, for reasons of cost or local provision for example.

A general object of the invention is therefore to propose an optimized solution for managing a pool of batteries, which addresses the drawbacks mentioned hereinabove.

More precisely, a first object of the invention is to propose a solution for recharging a pool of batteries making maximum use of a certain chosen energy source, which may be intermittent.

A second object of the invention is to propose a solution for recharging a pool of batteries that is compatible with their random arrival at recharging terminals.

For this purpose, the invention relies on a method for recharging a pool of batteries from a recharging device comprising several recharging terminals supplied electrically from at least one energy production source, characterized in that it comprises the following steps:

a. Estimation of the future production of energy, i.e. the predicted energy $E_{predicted}$ and the predicted power $P_{predicted}(t)$ as a function of time t, in the course of a reference period by at least one energy production source;

b. Estimation of the energy need $\Sigma_i E_i(t)$ for the recharging of the batteries present in the recharging device;

c. Computation of a dummy power $P_{dummy}$ which is less than or equal to the predicted power and able to address all or part of this energy need in a dummy period which may or may not be distinct from the reference period;

d. Scheduling of the rechargings of the batteries present in the recharging device over this dummy period.

The dummy energy can be computed as a function of the energy need $\Sigma_i E_i(t)$, or as a function of the energy need $\Sigma_i E_i(t)$ and of the predicted energy $E_{predicted}$ and/or of the forecast energy $E_{carpark}$ of energy consumption of the recharging device over the dummy period.

The dummy energy $E_{dummy}(t)$ can be defined at an instant t by the formula:

$$E_{dummy}(t) = \sum_i E_i(t) * \frac{E_{predicted}}{E_{carpark}}$$

The dummy energy $E_{dummy}(t)$ can be defined at an instant t by the formula:

$$E_{dummy}(t) = r \Sigma_i E_i(t) \text{ with } 0 < r < 2.$$

The forecast energy $E_{carpark}$ can be estimated on the basis of statistical data of energy consumption of the recharging device.

The predicted energy $E_{predicted}$ and/or the predicted power $P_{predicted}(t)$ can be estimated by a theoretical and/or empirical computation on the basis of data of weather forecasts and/or on the basis of past measurements of energy production.

The method for recharging a pool of batteries can comprise at an instant t a step of computing an end-of-dummy-period instant $2t_0$ for which the predicted energy produced by the energy sources of the recharging device corresponds to a predetermined function of the dummy energy $E_{dummy}$ through the following equation:

$$2[\int_0^{t_0} P\text{predicted}(u)du] - \int_0^t P\text{predicted}(u)du = E_{dummy}$$

The method for recharging a pool of batteries can comprise the definition of a dummy power $P_{dummy}(t)$ at an instant t by:

$$P_{dummy}(t) = P_{predicted}(t) \text{ if } t \leq t_0,$$

$$P_{dummy}(t) = \min[P_{predicted}(2t_0 - t); P_{predicted}(t)] \text{ if } t_0 < t \leq 2t_0$$

$$P_{dummy}(t) = 0 \text{ if } t > 2t_0$$

The step of scheduling the rechargings of the batteries present in the recharging device can consist in providing for the recharging of all these batteries between the instants t and at least $2t_0$.

The method for recharging a pool of batteries can comprise a prior step of detecting a change of configuration of the car park and a step of new scheduling of the rechargings of the batteries present in the recharging device at each detection of change.

The invention also pertains to a device for recharging a pool of batteries comprising several recharging terminals supplied electrically from at least one energy production source, characterized in that it comprises a central unit which implements the method for recharging the pool of batteries such as is defined above.

The device for recharging a pool of batteries can comprise a solar energy production source and/or a wind energy production source.

Its recharging terminals can be disposed in parking spaces for the recharging of a pool of batteries of electric automotive vehicles.

The invention also pertains to a system for recharging a pool of batteries comprising a central server, characterized in that the central server is linked to at least one recharging device such as described hereinabove by at least one communication means.

These objects, characteristics and advantages of the present invention will be set forth in detail in the following description of a particular mode of execution given in a non-limiting manner in conjunction with the attached figures among which:

FIGS. 1 to 4 illustrate the technical problem posed by the invention within the framework of a particular scenario by way of example.

FIG. 5 schematically represents the system implementing the method for recharging batteries according to one embodiment of the invention.

The invention will be illustrated in the case of a pool of electric vehicles by way of example. Such an electric vehicle can be an electric bike, an electric car, a segway, an electric scooter, etc. Naturally, the invention could readily be transposed to any electrical device equipped with a battery for its power supply, and requiring phases of recharging of its battery. Moreover, for simplification reasons, it will be considered in the following description that each vehicle is equipped with a single battery. However, the method could naturally be applied in a similar manner to vehicles equipped with several batteries. This is why the invention is more generally concerned with the problem of the recharging of a pool of batteries, especially in the case where their use is random and does not make it possible to ascertain precisely individually the moments at which their recharging will be necessary.

In order to illustrate the technical problem posed, let us take a concrete example of a car park for electric vehicles that is able to accommodate four vehicles, each space of the car park being furnished with a recharging terminal linked to a photovoltaic electrical energy production source. The battery recharging device associated with the car park can establish a forecast of the photovoltaic electrical production which will occur over a day, by taking account of weather forecasts and/or past measurements. The curve 1 of predicted available electrical power is thus obtained, represented in FIGS. 1 to 4, which comprises a peak at 6.5 kW in the middle of the day.

We assume that a first vehicle arrives in the car park at around 8 am, a second vehicle arrives at around 11.30 am, a third at around 12.30 pm and a fourth at around 3 pm.

Figure 1:
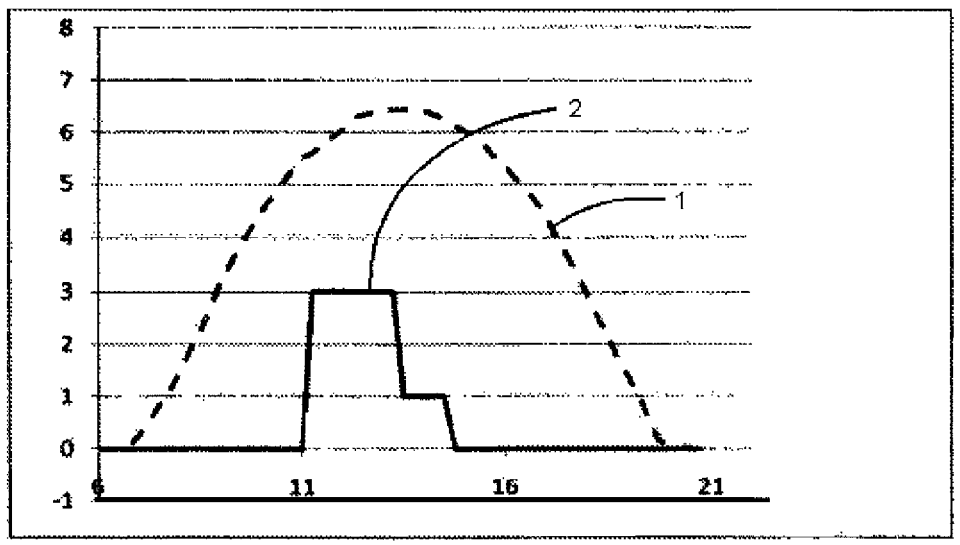

A first approach for scheduling over a day the recharging of the batteries determines the start of the recharging of the battery of the first vehicle at around 11 am, so as to be in a zone where photovoltaic electrical production will already be high and a priori sufficient, with a significant margin. FIG. 1 thus represents through the curve 2 the scheduled consumed power for the recharging of this first vehicle.

Figure 2:
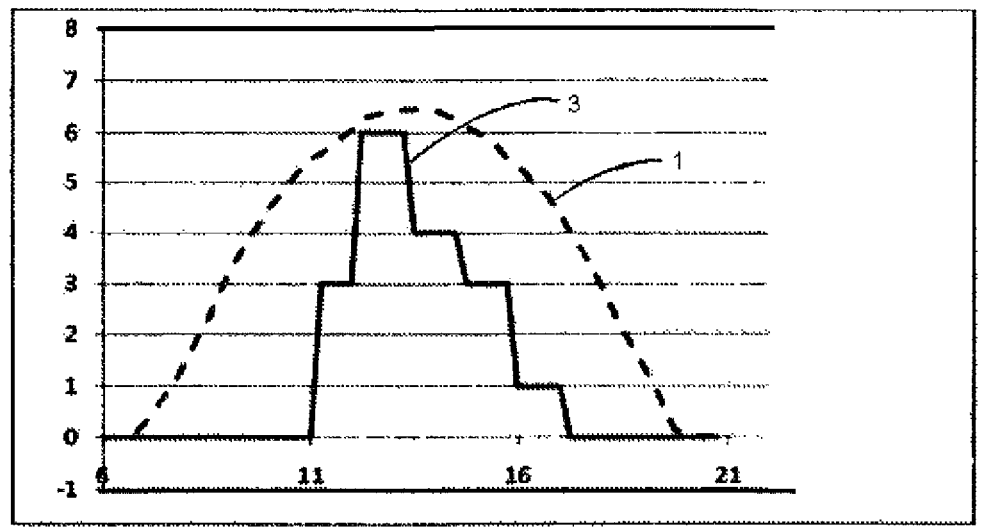

Thereafter, on the arrival of the second vehicle, the recharging device continues the recharging of the first vehicle, which has already begun and cannot be interrupted, and schedules the start of the recharging of the second vehicle at around 12.30 pm, so as to obtain a new curve 3 of electrical consumption for the simultaneous recharging of the first two vehicles, using the photovoltaic electrical energy, as is represented in FIG. 2.

Figure 3:
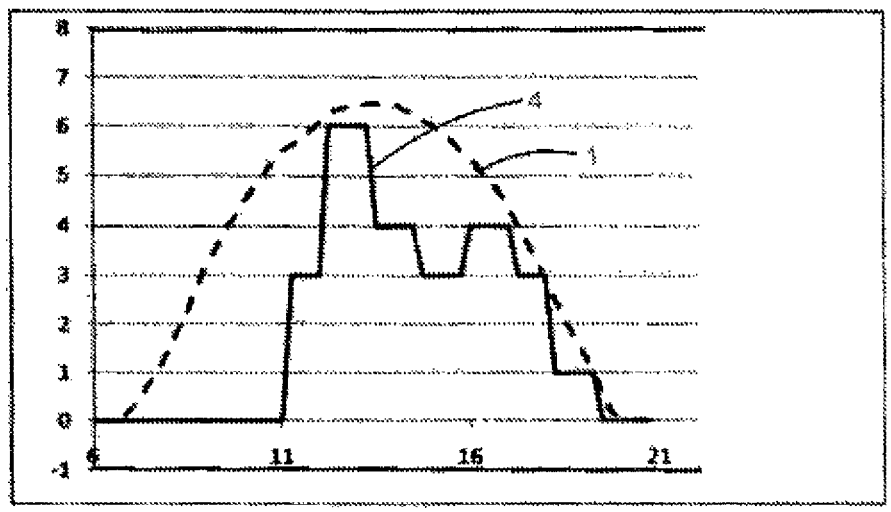

In a similar manner, on the arrival of the third vehicle, the recharging device continues the recharging of the first two vehicles and schedules the start of the recharging of the third vehicle at around 1.30 pm, so as to obtain a new curve 4 of electrical consumption for the simultaneous recharging of the first three vehicles, still fully using the photovoltaic electrical energy, as is represented in FIG. 3.

Figure 4:
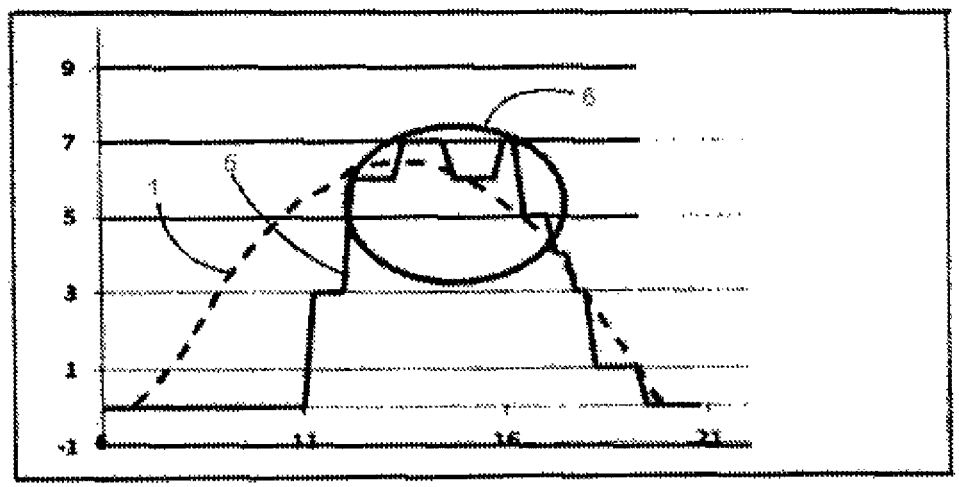

Finally, on the arrival of the fourth vehicle, the device continues the recharging of the first three vehicles and schedules the start of the recharging of the fourth vehicle at around 3.30 pm, so as to obtain a new curve 5 of electrical consumption for the simultaneous recharging of the four vehicles, represented in FIG. 4. In this scenario, a zone 6 is apparent in which the curve 5 overshoots the curve 1, thus signifying that the photovoltaic electrical production becomes insufficient to address the need for recharging the four batteries present in the pool with the photovoltaic energy source alone. The recharging device stops or then calls occasionally upon a complementary electrical energy source during these periods of overshoot of the zone 6.

During all the steps of this scenario, the scheduling of the periods of recharging of the batteries which is implemented on each arrival of an automotive vehicle in the car park, to obtain the curves 2 to 5, is done according to any known procedure, for example on the basis of mixed linear programming.

Figure 5:
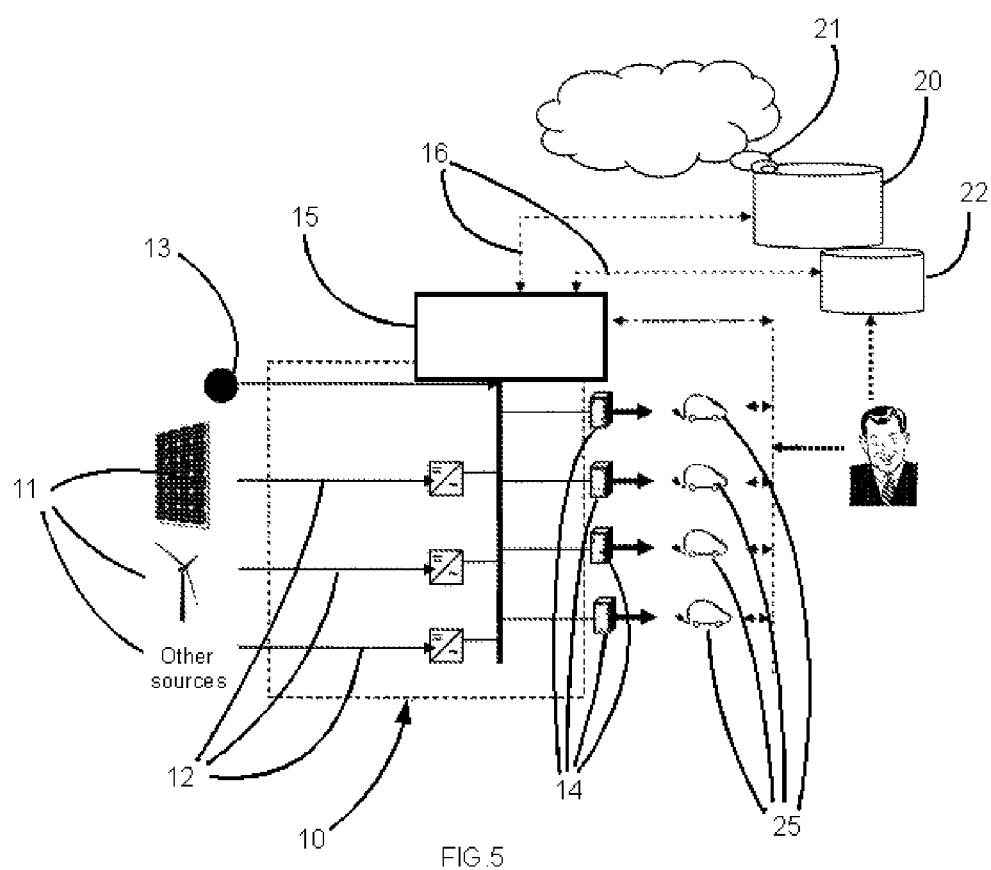

We shall now describe an embodiment of a method for recharging a pool of batteries, which makes it possible to cater in an optimized manner for a situation such as presented by the scenario set forth hereinabove, and which is implemented by a system illustrated by FIG. 5.

The recharging system comprises a recharging device 10, linked to one or more electrical energy production sources 11 by an electrical link 12, these sources being renewable and intermittent in this particular example, and linked in an optional manner to a traditional electrical grid 13 so as to cater for the possible inadequacies of the above sources. The objective is naturally not to resort to the traditional electrical grid 13 so as to avoid saturating it and to profit from the less polluting energy production sources 11 at the disposal of the recharging device. Furthermore, the invention also pertains to a system comprising at least one energy-autonomous recharging device, that is to say which is not linked to an electrical grid. The recharging device 10 comprises recharging terminals 14, thus supplied electrically by the energy production sources 11, distributed over electric vehicle parking spaces and to which electric vehicles 25 can connect. It comprises moreover a central unit 15, which comprises software and hardware means for controlling the recharging device 10 so as to implement the recharging method which will be detailed hereinafter. This central unit 15 thus comprises in particular the intelligence of the device, in the form of any type of computer. The recharging device 10 is moreover linked to a central server 20 by one or more communication means 16. This central server, which can be linked to several devices for recharging batteries, receives 21 information such as data of weather forecasts, and is linked to a database 22.

An embodiment of a method for recharging a pool of batteries, corresponding to a pool of electric automotive vehicles, from one or more recharging devices 10 will now be detailed. The objective of this method is to allow the scheduling of the recharging of several automotive vehicles over a day, by making maximum use of the energy sources, if possible without resorting to the electrical grid 13.

Figure 6:
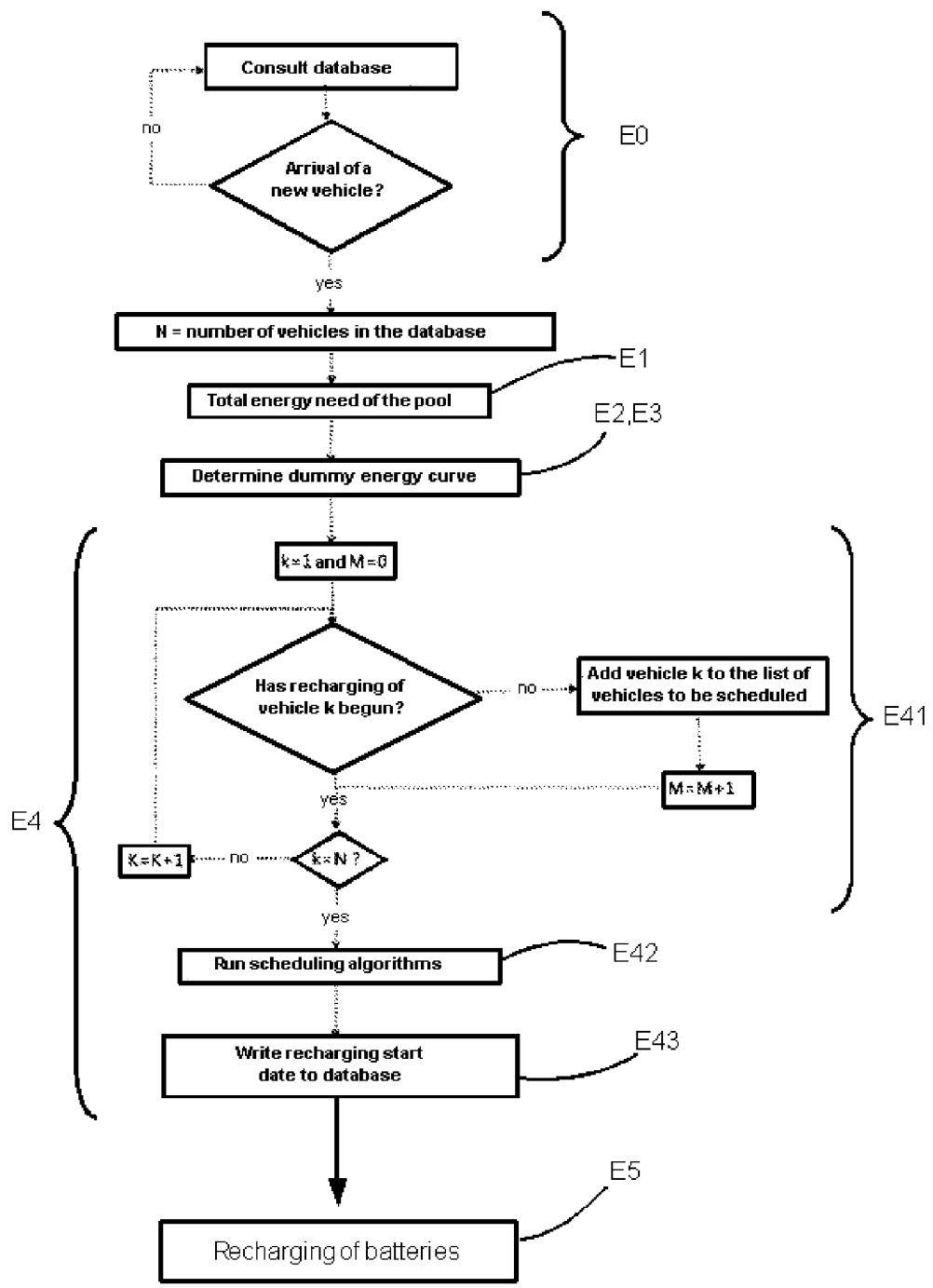
FIG. 6 represents an algorithm of a method for recharging batteries according to the embodiment of the invention.

The recharging method is for example implemented on each arrival or departure of a vehicle at the car park associated with the recharging device 10. It comprises, as represented by FIG. 6, a first step E1 of determining the energy need $E_i(t)$ of each battery i present in the pool at the instant t, and optionally of storage of the departure date for each battery. This energy need $E_i(t)$ depends for example on the state of charge of the battery i, which makes it possible to deduce therefrom the energy necessary to reach its full charge, on its particular charge profile, etc. As a variant, partial recharging of the battery i can also be envisaged, for example if the need of the user of the corresponding vehicle is low and/or in the case of inadequacy of energy production. This computation makes it possible to ascertain the total energy need at the instant t considered at the level of the recharging device, computed by $\Sigma_i E_i(t)$.

During this first step E1, the forecast energy $E_{predicted}$ which will be produced by the energy sources 11 over the day is estimated, on the basis of data of weather forecasts or by any other procedure, such as a so-called persistence procedure consisting in reusing the energy production measurements from the previous day, or on the basis of stored curves, such as a seasonality curve. These data can therefore be estimated theoretically and/or empirically. The forecast or predicted power $P_{predicted}(t)$ at each instant t of the day is thus also estimated. The forecast period will be called the reference period.

Moreover, the forecast energy $E_{carpark}$ which will be consumed by the batteries through the day from the instant t in respect of their recharging is also estimated, for example on the basis of statistical data of energy consumption of the recharging device, on the basis of storage of past consumptions. These statistical data thus take into account the planned frequency of patronage of the car park. They can be separated into several categories so as to take account of the different nature of very different statistics, such as a week or a weekend.

As a remark, the entire description considers the day to be a reference period for the implementation of the method. However, any other reference period is conceivable.

In a second step E2, the method comprises the computation of a dummy energy $E_{dummy}(t)$, which corresponds to an energy that it is desired to use to address the need identified in the scheduling at the instant t, as will be more clearly apparent subsequently.

In this embodiment, this dummy energy is defined by:

$$E_{dummy}(t) = \sum_i E_i(t) * \frac{E_{predicted}}{E_{carpark}}$$

The ratio $E_{predicted}/E_{carpark}$ represents the portion of energy that is able to address the statistical demand of the batteries. The dummy energy thus defined takes into account at one and the same time the energy need of the batteries and the a priori energy actually available to address it. As a variant, another function could have been defined for the computation of this dummy energy, for example in a simplified manner without taking this ratio into account, that is to say for example by considering that $E_{carpark}=E_{predicted}$. As a variant, this ratio can also be defined arbitrarily, independently of $E_{predicted}$ and $E_{carpark}$ so as to tailor the dummy power curve to take account of users' criteria, through a formula of type:

$$E_{dummy}(t)=r\Sigma_i E_i(t).$$

For example, if it is known that the pool of batteries is under-dimensioned relative to the needs, the predicted energy will always be less than the consumed energy: the ratio r will lie between 0 and 1. On the other hand, if it is known that the pool of batteries is overdimensioned relative to the needs, the predicted energy will always be greater than the consumed energy: the ratio r will be greater than 1. However, a value of greater than 2 would not be beneficial in so far as the pool being overdimensioned to excess, it is no longer necessary to use the invention which tends to bring together the two curves of prediction and consumption. Thus, generally, r is chosen between 0 and 2 inclusive.

In a third step E3, the method determines a dummy power curve, which makes it possible to distribute over time the dummy energy to be used. This step requires firstly the computation of an instant $t_0$ for which the energy produced by the sources of the recharging device corresponds to half the dummy energy computed at the previous step. The instant to is therefore defined by the following equation:

$$2[\int_0^{t_0} P\text{predicted}(u)du]-\int_0^t P\text{predicted}(u)du=E_{dummy}$$

The period from 0 to $2t_0$ will be called the dummy period. Thereafter, the dummy power curve is defined by:

$$P_{dummy}(t)=P_{predicted}(t) \text{ if } t \leq t_0,$$

$$P_{dummy}(t)=\min[P_{predicted}(2t_0-t);P_{predicted}(t)] \text{ if } t_0 < t \leq 2t_0$$

$$P_{dummy}(t)=0 \text{ if } t>2t_0$$

This approach thus makes it possible to determine a dummy curve of energy production provided by the energy sources 11 of the recharging device, which is optimal in the short term for addressing the identified need of the pool of batteries or which just suffices to meet this need.

In the particular case for which the dummy energy is greater than the predicted energy, that is to say the energy which will be produced by the energy sources 11 according to a prediction computation, then the dummy curve is chosen equal to the predicted power curve.

Thereafter, the recharging method implements a fourth step E4 of scheduling the recharging of the batteries of the pool within the dummy power curve defined during the previous step. This scheduling is done according to any known procedure, for example on the basis of mixed linear programming, according to the approach presented with reference to FIGS. 1 to 4. The method thus presents the advantage of preserving the already mastered procedures for scheduling energy consumption on the basis of a predefined available power curve.

However, the principle of the invention provides for a shorter period than the reference period of a day, which we call a dummy period since it is defined on the basis of the dummy energy, making it possible to initiate and schedule the short-term optimal recharging of the batteries present within the recharging device. This results in the earliest recharging of the batteries, and in a manner which is compatible with the available energy, thereby making it possible to keep a subsequent energy reserve in case one or more other vehicles should arrive. Moreover, the scheduling defines an energy consumption curve which best follows, as closely as possible, the profile of the predetermined dummy power curve, according to an optimized distribution.

Finally, when this scheduling is terminated, the method implements a last step E5 of recharging the batteries present according to the temporal scheduling determined by the previous steps.

FIG. 6 summarizes the steps of the recharging method in algorithm form.

In a prior step E0, the recharging device detects a possible change of the configuration of the pool of vehicles, such as a possible arrival of a new vehicle. Accordingly, the database 22 can be used to store this configuration of the car park and be consulted during this step. As a variant, this memory may be another local memory, directly linked to the central unit 15.

If an event of change of the configuration of the car park has occurred, the recharging method described above is implemented, so as to schedule in a dynamic manner the recharging of the batteries present, on the basis of the knowledge of the new number N of automotive vehicles present in the pool. It then implements steps E2 and E3 described above.

Thereafter, it implements the fourth step E4 of scheduling the actual recharging phases.

As a remark, this fourth step E4 comprises a first sub-step E41 consisting in determining the vehicles for which the recharging is already initiated, since these rechargings cannot in general be interrupted and are therefore continued automatically. However, the method can be implemented even if the chargings are interrupted, step E41 then being ignored. The scheduling then forms the subject of a second sub-step E42 and is more particularly concerned with the vehicles for which the recharging of the battery has not begun. Finally, this fourth step terminates with a third sub-step E43 of storage in an electronic memory of the recharging system of the results of the scheduling, comprising for each vehicle for which the recharging phase has not begun the scheduled start time for the recharging of its battery.

As a remark, all the envisaged storages can be done in the remote database or memory 22, and/or in a local memory disposed at the level of the central unit 15. Moreover, the steps of the method can also be implemented locally, at the level of the central unit 15, and/or remotely, at the level of the remote server 20 or at the level of the vehicles 25.

In all the steps of the method, the maximum number of vehicles is also considered, since it makes it possible to know whether the car park is or is not complete, whether it is liable to receive many more batteries to be recharged or not.

FIGS. 7 to 10 illustrate the implementation of the recharging method described above in the case of the scenario described above, with reference to FIGS. 1 to 4.

Figure 7:
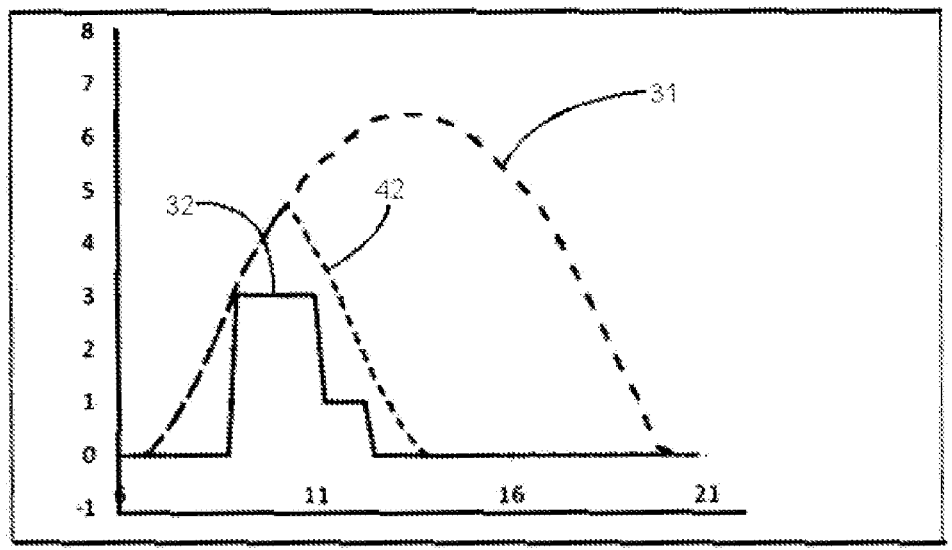
FIGS. 7 to 10 illustrate the result obtained by the method for recharging batteries according to the embodiment of the invention within the framework of the same scenario as that presented with reference to FIGS. 1 to 4.

Thus, FIG. 7 thus represents the curve 31 of predicted available electrical power, which corresponds to the curve 1 of FIG. 1, as well as the dummy power curve 42 defined by the method explained hereinabove. Finally, the curve 32 represents the scheduled consumed power in respect of the recharging of the first vehicle. In contradistinction to the approach presented with reference to FIG. 1, the method thus defines a dummy period [t1; t2] on the basis of the dummy power curve 42, during which the available energy suffices and is tailored to the recharging of the first battery. As seen in this figure, the recharging scheduling curve 32 follows as closely as possible the dummy power curve, which by definition delimits an optimal quantity of energy and in the nearest period.

Figure 8:
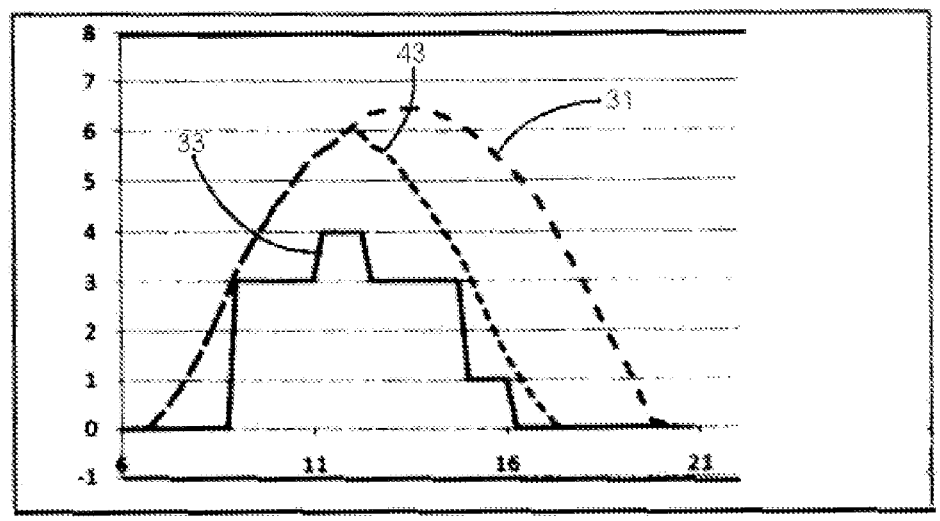

On the arrival of the second vehicle, the method recomputes the scheduling and determines a new curve 33 for scheduling the recharging of two batteries, represented in FIG. 8, integrated within a recomputed dummy power curve 43. Likewise, on the arrival of the third vehicle, the method recomputes the scheduling and determines a new curve 34, represented in FIG. 9, integrated within a new dummy power curve 44. Finally, on the arrival of the fourth vehicle, the method recomputes the scheduling and determines a scheduling curve 35, represented in FIG. 10, integrated within a dummy power curve 45.

Figure 9:
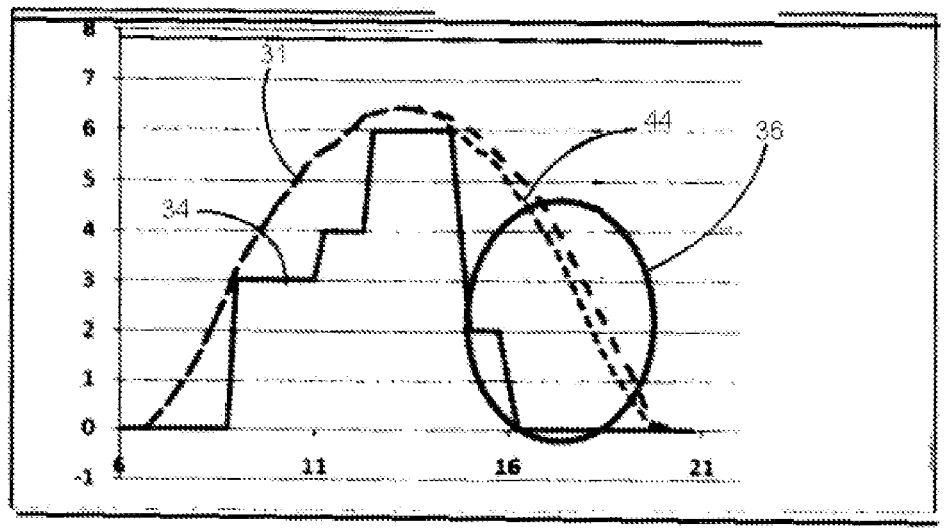
Figure 10:
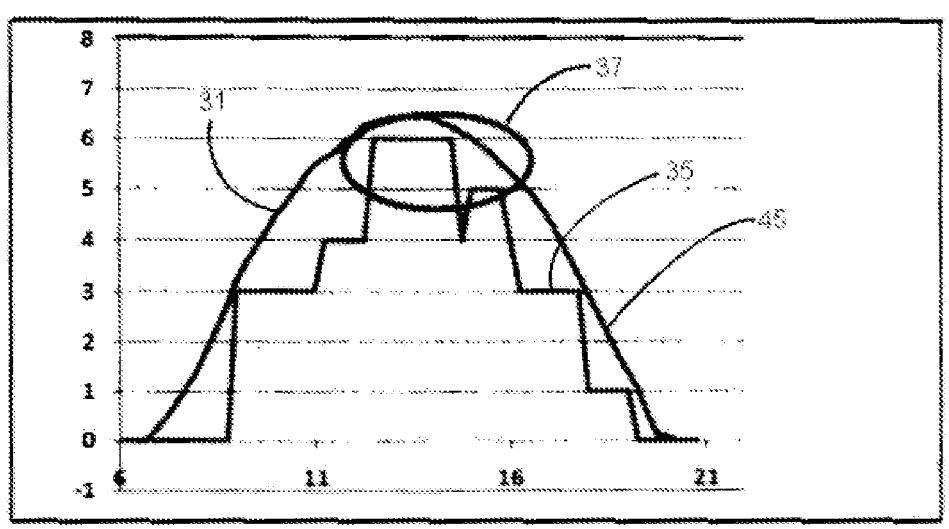

It is apparent that this method for recharging the batteries makes it possible to achieve their recharging by using exclusively the predicted energy, provided by the energy sources 11 of the recharging device, without resorting to an electrical grid 13, in contradistinction to the approach described with reference to FIG. 4. The zone 36 of FIG. 9 shows that the approach adopted of anticipating the rechargings of the batteries in the shorter term makes it possible to release an available energy slot at the end of the day so as to deal with a late arrival of an additional vehicle. The zone 37 of the curve 35 of FIG. 10 shows that the spike in consumption remains less than the available power generated by the recharging device on the basis of the energy production sources.

The invention claimed is:

1. Method for recharging a pool of batteries from a recharging device comprising several recharging terminals supplied electrically from at least one energy production source and a central unit which comprises software and hardware means for controlling the recharging device to implement the method for recharging a pool of batteries, wherein the method comprises the following steps:
    a. Estimation of future production of energy, comprising a predicted energy $E_{predicted}$ and a predicted power $P_{predicted}(t)$ as a function of time t, in a course of a reference period by at least one energy production source;
    b. Estimation of an energy need $\Sigma_i E_i(t)$ for the recharging of the batteries connected to the recharging device, where Ei(t) represents the energy of a battery i, i varying from 1 to the number n of batteries to recharge;
    c. Computation of a dummy power $P_{dummy}$ and a dummy energy $E_{dummy}$ which are respectively less than or equal to the predicted power and the predicted energy and able to address all or part of the energy needed in a dummy period which is or is not distinct from the reference period;
    d. Scheduling time of rechargings of each of the batteries connected to the recharging device over the dummy period and within a dummy power curve defined during a previous step instead of the predicted power; and e. recharging the batteries connected to the recharging device according to a temporal scheduling determined by the previous steps.

2. Method for recharging a pool of batteries according to claim 1, wherein the dummy energy is computed as a function of the energy need $\Sigma_i E_i(t)$, or as a function of the energy need $\Sigma_i E_i(t)$ and of the predicted energy $E_{predicted}$ and/or of a forecast energy $E_{carpark}$ of energy consumption of the recharging device over the dummy period.

3. Method for recharging a pool of batteries according to claim 2, wherein the dummy energy $E_{dummy}(t)$ is defined at an instant t by the formula:

$$E_{dummy}(t) = \sum_i E_i(t) * \frac{E_{predicted}}{E_{carpark}}.$$

4. Method for recharging a pool of batteries according to claim 3, wherein the forecast energy $E_{carpark}$ is estimated on a basis of statistical data of energy consumption of the recharging device.

5. Method for recharging a pool of batteries according to claim 1, wherein the dummy energy $E_{dummy}(t)$ is defined at an instant t by the formula: $E_{dummy}(t) = r \Sigma_i E_i(t)$ with $0<r<2$, wherein r is a ratio of energy available and battery demand.

6. Method for recharging a pool of batteries according to claim 1, wherein the predicted energy $E_{predicted}$ and/or the predicted power $P_{predicted}(t)$ is estimated by a theoretical and/or empirical computation on a basis of data of weather forecasts and/or on a basis of past measurements of energy production.

7. Method for recharging a pool of batteries according to claim 1, wherein the method comprises at an instant t, a step of computing an end-of-dummy-period instant $2t_0$ for which the predicted energy produced by the energy sources of the recharging device corresponds to a predetermined function of the dummy energy $E_{dummy}$ through the following equation:

$$2[\int_0^{t_0} P\text{predicted}(u)du] - \int_0^t P\text{predicted}(u)du = E_{dummy}.$$

8. Method for recharging a pool of batteries according to claim 7 wherein the method comprises a definition of a dummy power $P_{dummy}(t)$ at an instant t by:

$P_{dummy}(t) = P_{predicted}(t)$ if $t \leq t_0$, $P_{dummy}(t) = \min[P_{predicted}(2t_0-t); P_{predicted}(t)]$ if $t_0 < t \leq 2t_0$ $P_{dummy}(t) = 0$ if $t > 2t_0$.

9. Method for recharging a pool of batteries according to claim 8, wherein the step of scheduling the rechargings of the batteries present in the recharging device is performed for all said batteries between the instants t and at least $2t_0$.

10. Method for recharging a pool of batteries according to claim 1, wherein the method comprises a prior step of detecting a change of configuration of parking lot/garage and a step of new scheduling of the rechargings of the batteries present in the recharging device at each detection of change.

11. Device for recharging a pool of batteries comprising several recharging terminals supplied electrically from at least one energy production source, wherein the device comprises a central unit which implements the method for recharging the pool of batteries according to claim 1.

12. Device for recharging a pool of batteries according to claim 11, wherein the device comprises a solar energy production source and/or a wind energy production source.

13. Device for recharging a pool of batteries according to claim 11 wherein the recharging terminals are disposed in parking spaces for the recharging of a pool of batteries of electric automotive vehicles.

14. System for recharging a pool of batteries comprising a central server, wherein the central server is linked to at least one recharging device according to claim 11 by at least one communication means.

* * * * *